Jan. 17, 1939. F. MacCALLUM 2,144,574
DRY BATTERY
Filed Jan. 22, 1937
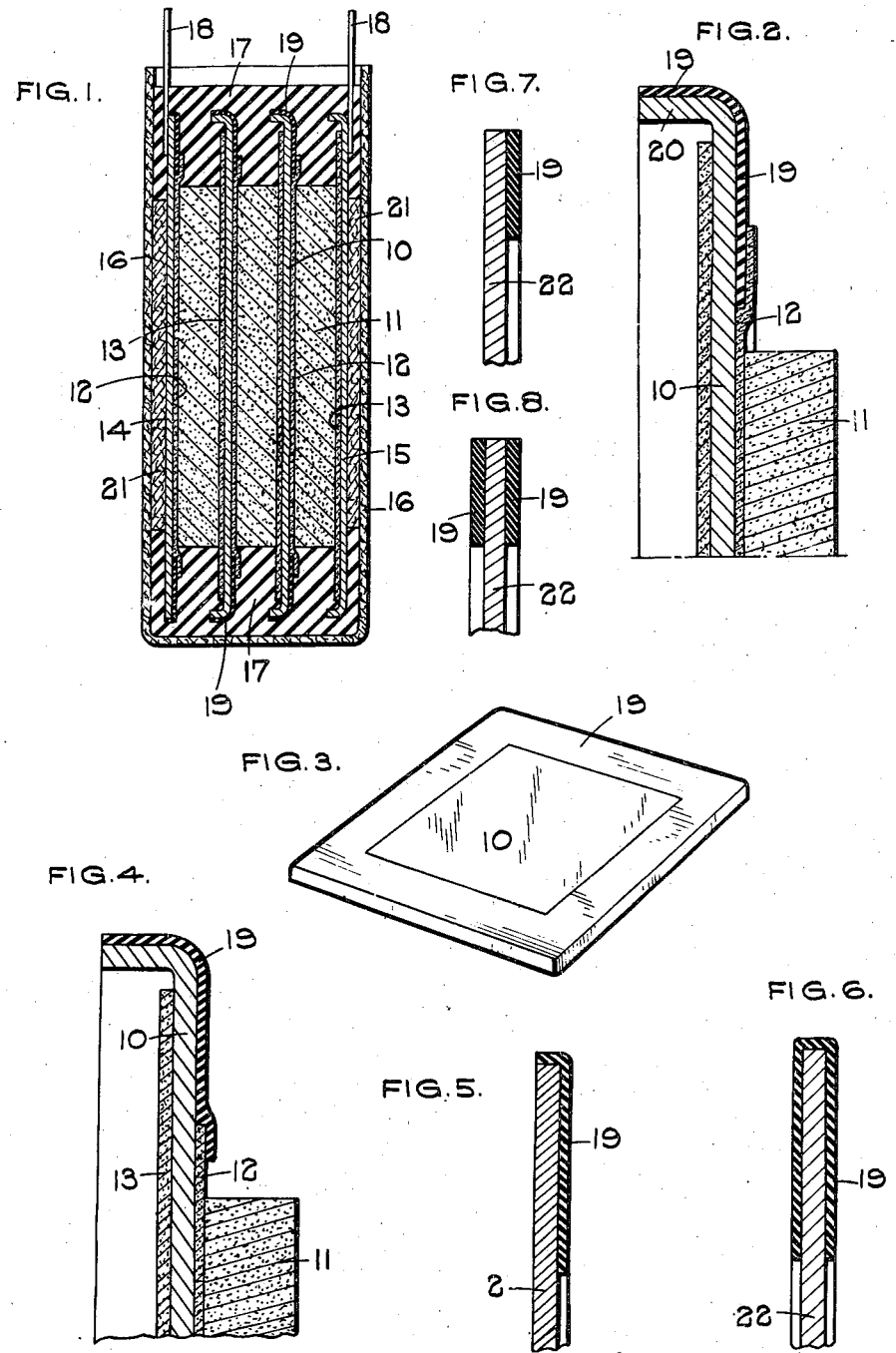

Patented Jan. 17, 1939

2,144,574

UNITED STATES PATENT OFFICE 2,144,574

DRY BATTERY

Frank MacCallum, Washwood Heath, Birmingham, England, assignor to Maxolite Holdings Limited, Kingsway, London, England Application January 22, 1937, Serial No. 121,891
In Great Britain April 18, 1935

7 Claims. (Cl. 136—111)

This invention relates to dry batteries of the kind comprising a number of zinc plates assembled together with carbon, electrolyte and depolarizer elements arranged sandwichwise.

It is common practice in dry batteries of the kind specified to assemble the elements of one or more cells sandwichwise and to bind the elements together by a coating or casing of wax, paraffin or the like, extending around the edges of the assembly and over the marginal portion of the outer plates or faces of the assembly, this coating or casing also sealing the edges of the assembled cell or cells.

The present invention, however, concerns the provision of a protecting coating around the marginal edges of one or both surfaces of the carbon zinc element prior to the assembly of the battery, the object of the invention being to provide for improved electrical isolation between cell and cell in a battery of the kind specified.

Referring to the drawing:—

Figure 1 shows in section a battery incorporating the present invention.

Figure 2 shows to an enlarged scale, a portion of same.

Figure 3 is a perspective view of one plate of the battery shown in Figure 1.

Figure 4 is a section of a portion of a slightly modified construction.

Figures 5 to 8 show in section further alternatives according to this invention.

In Figure 1 is shown a dry battery comprising a number of zinc plates 10 assembled together with depolarizer and electrolyte elements 11 therebetween, the two intermediate plates each having on one face a carbonaceous coating 12 comprising carbon particles in a suitable adhesive carrier and having on the other face a sheet 13 impregnated with electrolyte.

The end plate 14 has a carbon coating 12 on the inwardly directed face and the other end plate 15 has an electrolyte impregnated sheet 13 on its inwardly directed face. Thus, in the construction illustrated, the battery comprises three complete cells but any number of cells may be provided by adding elements 11 and duplex zinc and carbon plates 10.

The battery is enclosed in a casing 16 and sealing material 17 and the terminals or conductors 18 are suitably fixed to the end plates 14 and 15 and extend through the sealing material 17.

Prior to the assembly of the battery, the marginal portion of each carbon zinc element 10, 14, is provided with an adhering coating 19 of electrically insulating material for the purpose of insulating the electrolyte of one cell from the carbon of the next cell.

The insulating coating 19 is applied to that portion of the carbon side which is left uncovered by the depolarizer tablet when the battery is assembled, this coating extending over the marginal portion of the plate and the outer face of the pressed-up edges 20.

The carbon coating 12 is then applied and overlaps the edges of the coating 19 which insulates the carbonaceous coating 12 from the next cell of the battery and also forms a seating for the sealing material which is subsequently applied.

The essential properties of the coating 19 are:—

(1) It must form a flux for the sealing material 17 which is subsequently applied so that this sealing material will flow readily over the entire marginal portions of the plates 10, 14 and 15 and form an effective seal with such marginal portions.

(2) It is required to form a delayed solvent for the adhesive carrier in the carbonaceous coating so that the coating 19 marries up with the carbonaceous coating 12 to form an effective seal at the junction between these two coatings. It must not, however, have a damaging solvent effect on the coating 12 and must not unduly soften when the hot sealing material 17 is applied, but must soften sufficiently on its surface to become an integral part of the sealing 17 when cooled.

(3) It is preferably brushable and is required to form a non-conducting seal over the marginal portions of the plates 10, 14 and 15 to insulate the carbonaceous coating of one cell from the next cell of the battery.

(4) It must be chemical and water-proof and capable of adhering closely to the carbon-zinc element.

The preferred sealing material which has been found to meet all these requirements is prepared from the following constituents:—

50 parts by weight of the synthetic resin commercially marketed under the trade name "Albertol IIIL".
2 parts by weight of chlorinated rubber as marketed commercially under the trade name "Tegaphon".
35 parts by weight of linseed stand oil, and
50 parts by weight of xylol spirit.

The constituents are mixed together according to the following method:—

The chlorinated rubber is slowly dissolved in 20 parts of the linseed stand oil at a temperature of about 160° F.

The remaining linseed stand oil is cooked at about 400° F. with the "Albertol" until a complete intimate mixture is obtained. This liquid is then cooled to about 200° F. and the mixture of chlorinated rubber and linseed oil is stirred in until the whole is thoroughly mixed, after which the material is cooled to normal temperature and the xylol spirit added to produce a working or brushing varnish.

Any digested rubber could be used in place of the chlorinated rubber above referred to but this latter is preferred in that it can be obtained in granular form and is particularly suitable for use in this particular application.

The coating material is a delayed solvent for the carrier in the carbonaceous coating so that when the two coatings 12 and 19 are applied and overlapped at the junction therebetween, the two coatings dissolve partially one in the other and unite to form a complete seal over the junction between the two coatings.

The chlorinated rubber in the coating 19 delays the solvent action on the carrier in the carbon coating so as to limit this solvent action and prevent complete softening of the carbonaceous coating in an undesirable manner.

The chlorinated rubber constituent cannot be easily re-dissolved after it has once hardened and this constituent renders the coating 19 capable of resisting the fluxing action to some extent.

The chlorinated rubber does not dissolve in the synthetic resin but the linseed oil is a solvent both for the synthetic resin and for the chlorinated rubber and is compatible with both of these materials.

The synthetic resin marketed under the trade name "Albertol" also includes a certain amount of linseed oil and thus readily combines with the remaining constituents.

The sealing material 17 has to be applied hot and unless the coating 19 is formed from material capable of withstanding the action of this hot sealing 17, difficulties would be introduced due to softening of the sealing coating 19 with possible lifting of this coating from the zinc plate.

The combination of materials above specified provides a sealing coating 19 which will withstand the temperature conditions due to the application of the hot sealing 17 and no difficulty is experienced due to lifting or softening of the coating 19 as might be the case if a simple varnish or wax-like material was used for this coating 19.

Due to the chlorinated rubber constituent the coating 19 does not soften to the extent that an ordinary varnish or wax-like coating would, but it forms a flux for the sealing material 17 which thus flows readily over the coating 19 and effectively seals the entire marginal portion of the zinc plates.

The sealing compound 17 may be formed from the constituents above specified for the coating 19 but preferably includes slightly more oil and melts at a slightly lower temperature than the coating 19 to prevent complete softening of this coating 19 when the sealing 17 is applied hot.

In Figures 1 to 3 the insulating coating is shown as applied to the edges and to one side of the plate, i. e. that side which is to be coated with the carbonaceous coating, but the insulating material is applied only at the marginal portions of the surface near the edges of the element in the form of a border.

In this construction the insulating material 19 is applied before the carbonaceous coating 12 is applied to the zinc and an area of clean zinc is left within at the centre of the plate so that the carbon coating subsequently applied will make good and direct contact with the zinc at the bare portion in the centre of the plate and will overlap the insulating material by an appreciable amount, but will not extend to the edges of the plate.

In the modification shown in Figure 4, the carbon coating 12 is applied first, but its application is confined to an area smaller than the whole area of the plate, leaving a margin or border at and near the edges which are subsequently coated with the insulating material 19.

If the carbon coating extends right to the boundaries of the coated face of the zinc plate, it may only be necessary to coat the edges of the plate with insulating material 19, since the material 19 is particularly required at the edges of the carbon coating where both carbon and exposed zinc are adjacent one another, and where a small local cell would be set up if any electrolyte reached this position by leakage or otherwise. By providing a coating 19 at or over the junction between the carbon coating and the adjacent exposed zinc, the possibility of such local action is reduced or eliminated.

With the object of assisting in the securing of proper electrical isolation between cell and cell, the edges 20 of the plates are turned up so that each plate is formed into a shallow tray and the coating 19 is extended over at least one surface of such edges 20. This method provides a mechanical barrier to the encroachment of the electrolyte on one side of the zinc plate 10 to the carbon coating 12 on the opposite side of the zinc plate.

Further, such a construction extends the length of the path or gap between the electrolyte and the carbon, but without in any way increasing the size of the battery.

This method of construction also has the advantage that it provides greater stability or stiffness in the zinc plate.

In addition, the turned up edges of the zinc plate serve to position and locate both the depolarizer tablet and the electrolyte tablet or paste, and provide for both quicker and more accurate assembly of the cells.

Further, with the object of improving the sealing of the edges of the cells, the border of the electrolyte tablet may be kept in a dry state and free from electrolyte paste with the object of allowing the sealing or binding material, which is subsequently applied to the edges of the battery, to assist in forming the insulating barrier between the carbon on the one side of the plate and the electrolyte on the other side, and also to permit of easier handling of the elements during assembly, and provides the necessary factors of cleanliness and safety during the processes of manufacture.

The sealing fluids are poured in when the pack of cells is in a paper bag or container, and in order to allow the sealing material 17 to flow around between the back of the end plates and the container, each end plate is spaced away from the end of the container by a piece of packing 21, such as cardboard, placed against the outer side of the plate and stuck thereto, the packing material being set back from the edge of the plate. The end plate 14 has no turned-over edge 20 to permit this flow of sealing material.

In Figure 5 is shown the application of the coating 19 to the edge and marginal portion of one surface of a flat zinc plate 22 prior to the application thereto of the carbon coating.

In Figure 6 the coating 19 extends over the edge and marginal portion of both faces of the zinc plate.

In Figure 7 the coating 19 is applied to the marginal portion only of one face of the plate whilst in Figure 8 the coating is applied to the marginal portion of both surfaces but not to the edge of the plate.

The essence of the design of the battery is that a prescribed space must be available for sealing the edges of the cells, so that the electrolyte of one cell is efficiently insulated from the carbon of the next cell, and also to assist in preventing the formation of internal cells at the edges, and this is accomplished by means set out herein, and further by the insetting of the depolarizer tablet from the edges of the zinc.

What I claim then is:—

1. A carbon zinc element for use in the construction of a dry cell or battery comprising a zinc plate, an adhering coating of electrically insulating material applied to edge portions of said zinc plate, a thin carbonaceous liquid-proof layer adhering to one side of said plate, both of said coatings being applied to said zinc plate prior to assembly of the plate in the cell or battery and said coating of insulating material and said carbonaceous layer overlapping one another so as to form an insulating seal at the junction between the plate and the peripheral edges of the carbonaceous layer.

2. A carbon zinc element for use in the construction of a dry cell or battery comprising a zinc plate, a thin carbonaceous liquid-proof layer adhering to the centre part of one side of said plate leaving a margin free from said layer near the edge of said plate and an adhering coating of electrically insulating material applied to said margin prior to assembly of the plate in the cell or battery to form a non-conducting seal at such edge portions and to form a flux for sealing material subsequently applied, said coating of insulating material and said carbonaceous layer overlapping one another so as to seal the junction between said plate and the peripheral edges of said carbonaceous layer.

3. A carbon zinc element for use in the construction of a dry cell or battery comprising a zinc plate, a thin carbonaceous liquid-proof layer adhering to the centre part of one side of said plate leaving a margin free from said layer near the edge of said plate, an adhering coating of electrically insulating material applied to said margin prior to assembly of the plate in the cell or battery to form a non-conducting seal at such edge portions and to form a flux for sealing material subsequently applied and said carbonaceous layer overlapping the inner peripheral edges of said marginal coating.

4. In a flat type dry cell battery a depolarizer mix, a carbon electrode in contact with one side of said mix, an electrolyte and a zinc plate at the other side of said mix, said carbon electrode comprising a thin carbonaceous liquid-proof layer adhering to said plate, edge portions of said plate free from said carbonaceous layer, and an adhering coating of electrically insulating material applied to said edge portions of said zinc plate prior to assembly of the plate in the cell or battery, said coating of insulating material and said carbonaceous layer overlapping one another so as to form an insulating seal at the junction between the plate and the peripheral edges of the carbonaceous layer and to form a flux for sealing material subsequently applied.

5. In a flat type dry cell battery a depolarizer mix, a carbon electrode in contact with one side of said mix, an electrolyte and a zinc plate at the other side of said mix, said carbon electrode comprising a thin carbonaceous liquid-proof layer adhering to the centre part of one side of said plate, an adhering coating of electrically insulating material applied to the edges and to marginal portions of both surfaces of said zinc plate, both said carbonaceous layer and said insulating coating being applied to said plate prior to assembly of the plate in the cell or battery, said insulating coating adhering directly to said edges and marginal portions of the zinc plate to form a nonconducting seal at such edge portions and to form a flux for sealing material subsequently applied, said coating of insulating material and said carbonaceous layer overlapping one another so as to seal the junction between said plate and the peripheral edges of said carbonaceous layer.

6. In a flat type dry cell battery a depolarizer mix, a carbon electrode in contact with one side of said mix, an electrolyte and a zinc plate at the other side of said mix, said carbon electrode comprising a thin carbonaceous liquid-proof layer adhering to the centre part of one side of said plate, edge portions of said plate free from said carbonaceous layer, an adhering coating of electrically insulating material applied to said edge portions and covering the peripheral portions of the carbonaceous layer, said insulating layer being applied prior to assembly of the plate in the cell or battery and adhering directly to said edge portions of the plate to form a non-conducting seal at such edge portions and to form a flux for sealing material subsequently applied, said coating of insulating material and said carbonaceous layer overlapping one another so as to seal the junction between said plate and the peripheral edges of said carbonaceous layer, and an outer sealing coating enclosing said battery and uniting with said adhering coating.

7. A dry battery including a plurality of cells each incorporating a depolarizer mix, a conducting plate, a thin carbonaceous layer adhering to said plate, an adhering coating of electrically insulating material on edge portions of said plate, said insulating coating being in the form of a thin narrow band extending around the periphery of said plate, said coating of insulating material and said carbonaceous layer overlapping one another so as to form an insulating seal at the junction between the plate and the peripheral edges of the carbonaceous layer, both said carbonaceous layer and said insulating coating being applied to said plate prior to assembly of the plate in the cell, said carbonaceous layer forming one electrode of the cell, a zinc plate forming the other electrode of the cell, and an outer sealing skin enclosing said battery and uniting with said insulating coating which forms a flux therefor.

FRANK MacCALLUM.